Oct. 24, 1933.  F. J. POSTEL  1,932,228
LIQUID DENSITY INDICATOR FOR TANKS
Filed Feb. 1, 1932  2 Sheets-Sheet 2
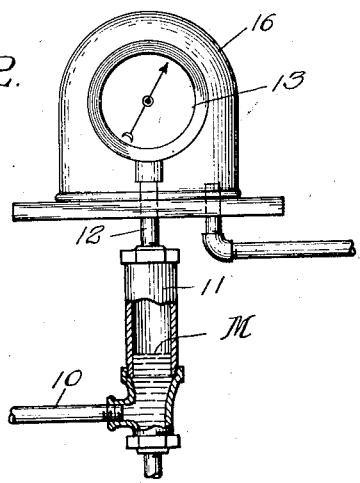
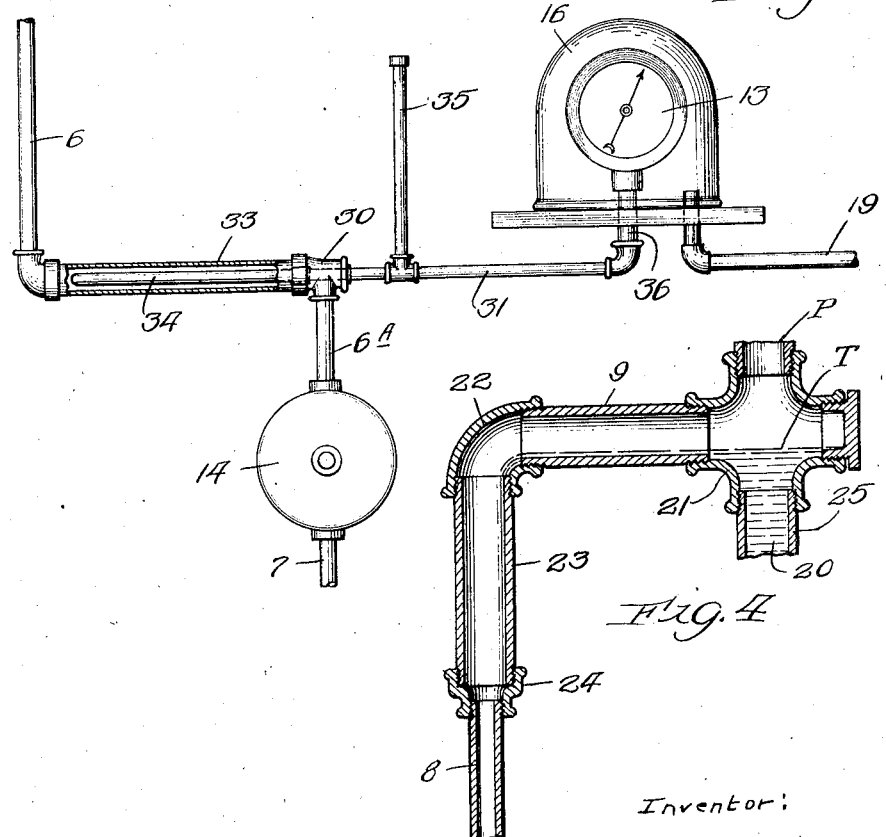
Inventor:
Fred J. Postel
by Albert Scheibli
Attorney Patented Oct. 24, 1933

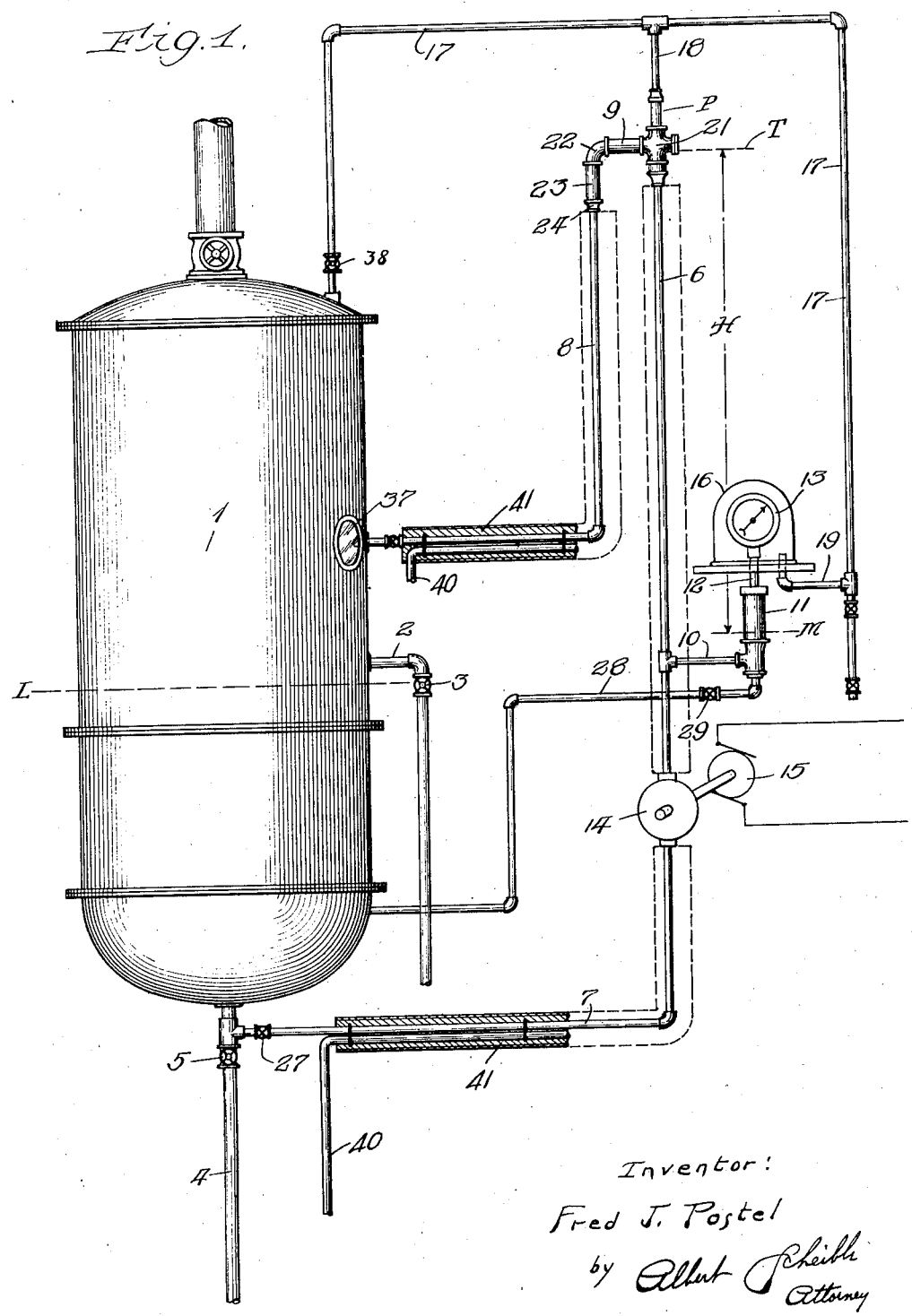

1,932,228

UNITED STATES PATENT OFFICE 1,932,228

LIQUID-DENSITY INDICATOR FOR TANKS

Fred J. Postel, Milwaukee, Wis.

Application February 1, 1932. Serial No. 590,113

3 Claims. (Cl. 265—44)

My invention relates to means for ascertaining the density of liquid in a tank or other container without drawing a sample of the liquid from the tank, and more particularly to means for continuously indicating (and if desired, recording) the density of liquid in the tank.

Generally speaking, the objects of my invention are those of providing a continuously reading indicating system which can be readily attached to an evaporating or finishing pan or other liquid container; which is applicable alike to light liquids of low viscosity as well as to heavier syrups and other liquids which will congeal on cooling, especially when at rest in "dead end" pockets; which is of such design and construction that the operation of cleaning the pan or container automatically cleans the indicating device at the same time, without further effort or labor; and which will require no highly skilled attendant.

Moreover, my invention aims to provide a liquid-density indicating system arranged so that the readings of the gauge will not be affected by variations in the vapor pressure (or degree of vacuum) above the liquid, nor affected by changes in the temperature of the room in which the indicator of the system is positioned.

Still further and also more detailed objects of my invention will appear from the following specification and from the accompanying drawings, in which drawings Fig. 1 is an elevation of an embodiment of my invention showing a continuously indicating liquid-density indicator connected to an evaporator pan which is operating under a vacuum.

Fig. 2 is an enlarged elevation of the density-indicating pressure gauge and of parts adjacent to it, partly in section.

Fig. 3 is a similar enlargement of the density-indicating gauge and of parts adjacent to it, with a portion of the liquid pipe line in section, showing a different arrangement for preventing the liquid from reaching the indicating gauge.

Fig. 4 is an enlarged section through the weir-affording portions of Fig. 1 and parts adjacent thereto, taken in the plane of the drawing of Fig. 1.

To obtain a continuous and dependable indication of the density of the liquid in an evaporator pan after the manner illustrated in Fig. 1, I operate as follows:

(1) I continuously force liquid by a pump at a uniform slow rate of flow through a pipe circuit leading from the bottom of the pan and ending at the pan at considerably higher elevation, desirably above the level of the liquid.

(2) I include in this pipe line an upright pipe portion reaching to a still higher elevation, desirably considerably higher than the top of the evaporator pan, and also include a weir at the upper end of this upright portion, so that the pump continuously draws liquid from the bottom of the pan and forces this liquid up over the weir, and so that this liquid then returns by gravity from beyond the weir to the pan.

(3) I connect a pressure gauge to the said upright pipe portion at a considerable distance below the weir, so as to have the gauge indication responsive to a correspondingly tall head of liquid between this connection and the weir. Thus disposed, the gauge will indicate the pressure required to force the liquid up beyond this connection to the weir when the pump is running, and will indicate the static pressure of the corresponding head of liquid when the pump is stopped.

(4) I interpose means between the said pipe line and the pressure gauge for preventing a contact of the liquid with any portion of the pressure gauge.

(5) I provide vacuum pipe connections from the upper portion of the evaporator pan to both the weir and the housing of the indicating gauge, so as to nullify the effect which changes in the degree of vacuum in the evaporator would otherwise have.

Fig. 1 includes an evaporator pan 1 operating under a vacuum, to which liquid is admitted through a liquid supply pipe 2 controlled by a valve 3, and from which the liquid can be drained out through a drain pipe 4 controlled by a second valve 5. Since the arrangements for heating the pan and for producing the desired degree of vacuum in its upper portion form no part of my invention, these have not been illustrated.

Connecting vertically spaced portions of the pan is a piping which includes a riser pipe 6, and a lower pipe 7 operatively connected to the bottom of the pan, the needed connection being here shown as made to the drain pipe 4 between the valve 5 and the pan. The upper end of the riser pipe 6 is connected by a weir-pipe portion (generally designed as 9) to a liquid return pipe 8 which leads to the pan above the normal level L of the liquid in the pan, the general construction of the weir-pipe portion being preferably such that this has a bore considerably larger than the bores of the riser pipe 6 and the return pipe 8, and the weir-pipe portion being constructed so that it operatively affords a weir over which liquid forced upwardly through the pipe 6 must flow before it reaches the return pipe 8.

Connected to the riser pipe 6, desirably at a considerable distance below the said weir-pipe portion 9 is a branch pipe 10 leading to the lower end of an air chamber 11, from the upper end of which casing a pipe 12 leads upward to a pressure-gauge 13. Interposed in the riser pipe 6 below its connection to the branch pipe 10 is a low velocity pump 14 driven by a motor 15 at such a low rate of speed that the level T of the liquid 20 in the pipe line is maintained only slightly above the bottom of the bore of the horizontal pipe 9 of the weir portion of my liquid pipe line, as shown in Fig. 4.

In practice, this weir portion may be cheaply constructed of ordinary pipe fittings including a cross 21 connecting the upper end of the riser pipe 6 with a short horizontal pipe 9, which latter pipe leads to the return pipe 8 through an elbow 22, a short down pipe 23 and a reducing coupling 24. By making the parts 21, 9, 22 and 23 all of a larger pipe size than the riser pipe 6 and the return pipe 8, I can reduce the flow of liquid within the horizontal pipe portion to a quite shallow stream, the depth of which is negligible in comparison with its height above the level M of the liquid in the air chamber 11.

Thus arranged, the pipes 7, 6 and 8 together with the weir-affording pipe portion 9 form a piping through which liquid will be drawn from the bottom of the pan 1 by the action of the pump, forced up the riser pipe 6 at a constant rate of flow, and returned to a higher portion of the pan through the weir-affording pipe portion 9 and the return pipe 8. During this flow of the liquid, the portion of the liquid between the level T at the said weir-forming portion and the level M of the liquid in the air chamber 11 affords a substantially constant hydraulic head affecting the liquid in the said branch pipe, thereby making the pressure gauge 13 responsive to the pressure of the said portion of the liquid.

By making the bore of the air chamber 11 below the pressure gauge considerably larger in diameter than the bore of the pipes 6 and 10, I provide a relatively large air capacity for this chamber to minimize the effect of a surging of liquid in that chamber, and also reduce the effect of the varying compression of the air within this chamber on the lower level M of the hydraulic head to which the pressure gauge responds. Consequently, the extent to which this level M varies is negligible in proportion to the height of the liquid head H between that level and the upper or weir level T, and the pressure gauge is directly responsive to the head of a column of the liquid of the diameter of the bore of the pipe 6 and of the height of the said head, as long as the liquid is of a constant viscosity. And if the liquid in the vacuum pan is of a type in which the change of density is definitely proportioned to the change in viscosity during this contraction of the liquid, the dial of the gauge can be graduated to afford a direct indication of the density, but a differently calibrated dial will be needed for any liquid in which the changes of density and viscosity are not similarly proportioned.

However, if the pump is halted long enough for the liquid to become stationary in the head-forming pipe portion 6, the modifying influence of differences in viscosity on the readings of the gauge is eliminated, as also the vibration of the indicator needle of the gauge in response to the impulses of the pump. For this reason, I preferably halt the pump until the indication needle comes to rest before taking the final reading to obtain both a greater accuracy and a reading proportioned only to the density of the liquid. Since this accuracy is only needed when the gauge indication is near the desired density of the liquid, the operator merely watches the indicator occasionally (with the pump continuously running) until that density indication is approached and then starts taking the more accurate readings at short time intervals with the pump halted, thereby eliminating needless readings.

In addition to providing the previously described simple means for continuously indicating the hydraulic head of a substantial column of the liquid in the container, I also provide means for avoiding a modification of the gauge readings by variations in the vapor pressure within the container which is particularly important when the concentration is being done under a partial vacuum.

For this purpose I connect the upper portion of the vacuum pan 1 through a vacuum-equalizing pipe 17 and through branch pipes 18 and 19 with both the weir-affording portion of the liquid circulating pipe system and the interior of a transparent casing 16 which houses the pressure gauge, as shown in Fig. 1. As here shown, the connection to the liquid pipe system is made (from a portion of the vacuum-equalizing pipe 17 which extends above the pipe cross 21) to that cross through a downwardly extending pipe 18 and an interposed pipe P. By making this pipe P of considerably larger bore than the branch pipe 8 and connecting the pipe P to the cross 21 considerably above the upper lever T of the circulating liquid, I accomplish two important purposes: First, I prevent liquid spray or vapor from being tossed up high enough (by initial surgings when the pump is started) to mingle with the vapor in the pipe 17 and its branches. And second, I prevent a sudden increase of the vacuum from boiling liquid within the weir-affording portion 9, which boiling would modify the height of the head to which the gauge responds.

With the vacuum equalizing system thus arranged, the upper end of the weighed column of liquid is subject to the same vapor pressure as that in the vacuum pan, and so is the interior of the glass topped casing 16 which houses the pressure gauge 13. Consequently, the indicated density of the weighed liquid is the same as that of the liquid within the vacuum pan, and the indication also is not affected by variations in the pressure of the air in which the entire apparatus is disposed.

When the concentration of the batch of liquid in the vacuum pan has been completed, the contents of the pan are emptied through the drain pipe 4 after opening the valve 5, thereby also drawing liquid out of the lower portion 7 of the liquid-circulating piping. However, the blades or other liquid-propelling portions of the pump 14 would prevent the emptying of the riser pipe 6 and the lower portion of the air chamber 11, so that constituents of the liquid may form sticky deposits in the latter two portions of my system.

To avoid this, I connect the bottom of the air chamber 11 to a lower portion of the vacuum pan by a drain pipe 28 controlled by a valve 29. When this valve is opened along with the drain valve 5, the liquid contents of the air chamber, the pipe 10 connected to it, and the part of the riser pipe 6 above this pipe 10 will drain out by gravity through the lower part of the pan and the drain pipe 4. This emptying of the pipe system allows air to fill the air chamber 11. Then, during a restarting of the system the pumping of liquid fills the pipe 10 and compresses air in the chamber 11 to a pressure corresponding to the weight of the column of liquid in the portion of the pipe 6 which is of the length H indicated in Fig. 1.

While the point at which the return pipe 8 is connected to the pan may be varied, I preferably dispose the outlet end of this pipe above the maximum level L of the liquid in the pan and adjacent to a window 37 in the side wall of the vacuum tank, through which window the operator can readily see the discharge of liquid from the return pipe. When this is a steady stream, it shows that a continuous sample of the liquid in the tank is being circulated through the head-forming part of the piping to which the gauge is responsive, and that the pipe 6 is full so that the indicated pressure of the air in the air chamber truly represents the density of the liquid. On the other hand, a turbulent discharge from the return pipe will indicate an air leakage or a boiling of the liquid in the circulating system by the steam pipe which parallels the circulating pipe as hereafter described, either of which would affect the accuracy of gauge indication and hence would need to be corrected before the gauge is read.

However, while I have heretofore described my invention in an embodiment including numerous desirable details of construction and arrangement, I do not wish to be limited in these respects, since many changes might be made without departing either from the spirit of my invention or from the appended claims.

For example, Fig. 3 shows a modification of part of my system which may be desirable, in substitution for the air chamber 11 of Fig. 2, with some liquids. In this figure, the circulating pipe portion 6A leading from the pump 14 is connected to the riser pipe 6 through a larger diametered horizontal pipe 33 and a T-fitting 30. Extending into this fitting is a water pipe 31 which has its outer end connected to the pressure gauge 13. Fitted at its mouth upon the other end of this water pipe is an elongated water bag 34 (of a compressible rubber or the like) which is sufficiently smaller in its outside diameter than the bore of the pipe 34 so that the circulated liquid can pass freely between the said bore and the water bag.

When the water bag and the horizontal pipe 31 have been filled with water, admitted through a filler pipe 35, the inward pressure on this bag due to the weight of the column of liquid in the riser pipe will compress the bag.

With this device, no air chamber is used, it being desirable to eliminate all air in pipes 31 and 36, and even from the Bourdon spring of the gauge, so that these pipes are entirely filled with water. Since water is substantially non-compressible, the slightest change of pressure on the water bag is transmitted to the gauge without any appreciable change in shape of the water bag, thus eliminating an error which would be introduced by the resiliency of the rubber if there were any considerable change in shape. If there were any air in this portion, there would have to be more of a change of section for a given variation of pressure, because of the compressibility of the air, and therefore a greater error due to the resiliency of the rubber.

In practice, the depth of the stream of liquid flowing over the weir may be varied as long as the weir-forming pipe portion 9 is not full (as it otherwise would have no weir effect), and as long as this stream depth is sufficiently uniform so that the total head height H in Fig. 1 is not varied materially.

To maintain the syrup in the circulating pipe system in a freely flowing condition and at a fairly constant temperature regardless of changes in the temperature of the room in which my system is installed, I desirably parallel this pipe system by a steam pipe line 40 suitably tied to the piping by wire bands and encased conjointly with the liquid circulating piping by a heat-insulating covering 41, as indicated in dotted lines in Fig. 1. This paralleling steam pipe also prevents liquid in the circulating pipe from solidifying in cold weather so as to prevent a starting of the pump. If this steam pipe should heat the liquid circulating pipe to a temperature above the boiling point of the circulating liquid under the vacuum to which it is subjected at the weir and at its discharge into the pan, the resulting vapor bubbles will cause a turbulent discharge of liquid into the pan. This the operator can readily see through the window 37 close to the discharge, so as to eliminate the overheating before he reads the indicator again, as any vapor bubbles in the effectively weighed column of liquid would give an incorrect reading.

In practice, I also desirably provide a hand valve 38 in the vacuum pipe line 17 adjacent to the pan, so that this vacuum-equalizing line can be entirely shut off when desired without interfering with the continued operation of the vacuum in the pan.

With my density indicating system thus installed, it will be obvious from the above that beginning with a few minutes after the pump is started, the gauge gives an instantly readable and continuous indication of the density of a sample of liquid which entered the circulating pipe system only a few moments earlier. Consequently, there is hardly any time interval between the taking of the sample from the pan and the observation of an approximately accurate reading of the density. Then when the continuously indicated density is close to that to which the liquid is to be boiled down, the operator also can speedily take a still more accurate (static head) reading by merely stopping the pump and taking this gauge reading as soon as the gauge needle again comes to rest.

I claim as my invention:

1. Means for indicating the density of liquid in a container, comprising a pipe line disposed exteriorly of the container and connecting two vertically spaced portions of the container, the said piping including an upright portion extending higher than the upper of the said spaced portions; a weir disposed in the said piping at the upper end of the upright pipe portion; a branch pipe leading from a part of the upright portion considerably below the weir; an indicator assembly connected to the branch pipe and responsive to the weight of liquid in the part of the upright pipe between the weir and the connection of the branch pipe to the upright pipe; and pumping means connected to the piping below the connection of the branch pipe thereto for forcing the liquid in the said upright pipe portion upwardly at a constant rate of flow; the indicating means including a pressure indicator; a casing housing the pressure indicator to seal the latter from the outer air, and piping connecting the interior with the said casing to the interior of the container considerably above the upper of the said vertically spaced connections to the container to equalize the pressure in the casing with the vapor pressure above the liquid in the container and with the vapor pressure upon the surface of the liquid flowing over the weir.

2. Means for indicating the density of liquid in a container, comprising a pipe line disposed exteriorly of the container and connecting two vertically spaced portions of the container, the said piping including an upright pipe portion extending higher than the upper of the said spaced portions; a weir disposed in the said piping at the upper end of the upright pipe portion; a branch pipe leading from a part of the upright portion considerably below the weir; an indicator assembly connected to the branch pipe and responsive to the weight of liquid in the part of the upright pipe between the weir and the connection of the branch pipe to the upright pipe; and pumping means connected to the piping below the connection of the branch pipe thereto for forcing the liquid in the said upright pipe portion upwardly at a constant rate of speed; and a secondary pipe system connecting an upper portion of the container with the portion of the piping which houses the weir so as to equalize the vapor pressure above the weir with that above the liquid in the container, the part of the secondary pipe system adjacent to the weir extending downwardly and being of considerably larger bore than the said upright pipe portion.

3. Means for indicating the density of liquid in a vacuum pan, comprising an exterior piping connecting vertical spaced portions of the pan, pumping means for circulating liquid through the said piping, a weir disposed within the said piping and over which the circulating liquid flows, indicating means operatively connected to the piping below the weir and responsive to the weight of the liquid in a pipe portion having its upper end at the weir, and means for equalizing the vapor pressure in the part of the container above the said spaced portions with that surrounding the indicating means.

FRED J. POSTEL.